United States Patent
Hanonge (10) Patent No.: US 12,228,223 B2
(45) Date of Patent: Feb. 18, 2025

(54) FLEXIBLE PIPE WITH RADIAL GAS PASSAGE, MANUFACTURING METHOD AND USE THEREOF

(71) Applicant: TECHNIP N-POWER, Courbevoie (FR)

(72) Inventor: Didier Hanonge, Allouville-Bellefosse (FR)

(73) Assignee: TECHNIP N-POWER (FR)

( * ) Notice: Subject to any disclaimer, the term of this patent is extended or adjusted under 35 U.S.C. 154(b) by 381 days.

(21) Appl. No.: 17/638,010

(22) PCT Filed: Aug. 26, 2020

(86) PCT No.: PCT/EP2020/073835
§ 371 (c)(1),
(2) Date: Feb. 24, 2022

(87) PCT Pub. No.: WO2021/037902
PCT Pub. Date: Mar. 4, 2021

(65) Prior Publication Data
US 2022/0275884 A1    Sep. 1, 2022

(30) Foreign Application Priority Data
Aug. 28, 2019   (FR) ..................................... 1909479

(51) Int. Cl.
*F16L 11/08*  (2006.01)
*F16L 11/16*  (2006.01)

(52) U.S. Cl.
CPC ............. *F16L 11/083* (2013.01); *F16L 11/16* (2013.01)

(58) Field of Classification Search
CPC ................................ F16L 11/083; F16L 11/16
See application file for complete search history.

(56) References Cited

U.S. PATENT DOCUMENTS 3,682,203 A * 8/1972 Foti .......................... F16L 11/16
138/135
5,730,188 A * 3/1998 Kalman ................. F16L 11/083
138/135

(Continued)

FOREIGN PATENT DOCUMENTS

FR    2 846 395 A1    4/2004
FR    2 852 658 A1    9/2004

(Continued)

OTHER PUBLICATIONS

International Search Report mailed Oct. 13, 2020 in corresponding PCT International Application No. PCT/EP2020/073835.

(Continued)

*Primary Examiner* — David R Deal
(74) *Attorney, Agent, or Firm* — OSTROLENK FABER LLP (57) ABSTRACT

A piping comprising a pressure vault formed of at least one interlocked shaped wire, each turn of the wire having at least one stud and a groove adjacent the stud, the stud interlocking into a groove of an adjacent turn of a shaped wire. At least one additional gas circulation passage through the stud and/or in the bottom of the groove is defined, the passage allowing gas circulation between the inside and the outside of the vault in addition to clearance between the stud of one (Continued)

turn and the bottom of the groove of the adjacent turn, or in the absence of clearance between the stud of one turn and the bottom of the groove of the adjacent turn.

16 Claims, 11 Drawing Sheets

(56) References Cited

U.S. PATENT DOCUMENTS

| | | | | |
|---|---|---|---|---|
| 5,813,439 | A * | 9/1998 | Herrero | F16L 11/083 138/135 |
| 9,835,273 | B2 * | 12/2017 | Clements | F16L 11/15 |
| 10,203,053 | B2 * | 2/2019 | Foti | F16L 11/15 |
| 2002/0157723 | A1 * | 10/2002 | Odru | F16L 11/16 138/135 |
| 2002/0195157 | A1 * | 12/2002 | Foti | F16L 11/16 138/135 |
| 2003/0056845 | A1 * | 3/2003 | Fraser | F16L 11/082 138/104 |
| 2003/0164196 | A1 * | 9/2003 | Glejbol | F16L 11/16 138/135 |
| 2004/0154677 | A1 * | 8/2004 | Coutarel | F16L 11/083 138/135 |
| 2009/0000683 | A1 * | 1/2009 | Sheldrake | F16L 11/12 138/135 |
| 2011/0030831 | A1 * | 2/2011 | Clements | F16L 11/16 29/890.144 |

FOREIGN PATENT DOCUMENTS

| | | |
|---|---|---|
| WO | WO 2004/085900 A1 | 10/2004 |
| WO | WO 2015/121316 A1 | 8/2015 |
| WO | WO 2018/006919 A1 | 1/2018 |

OTHER PUBLICATIONS

Written Opinion mailed Oct. 13, 2020 in corresponding PCT International Application No. PCT/EP2020/073835.
Search Report mailed Mar. 5, 2020 in corresponding French Patent Application No. 1909479.

* cited by examiner

FIG.11

FLEXIBLE PIPE WITH RADIAL GAS PASSAGE, MANUFACTURING METHOD AND USE THEREOF

CROSS-REFERENCE TO RELATED APPLICATIONS

The present application is a 35 U.S.C. §§ 371 national phase conversion of PCT/EP2020/073835, filed Aug. 26, 2020, which claims priority to French Patent Application No. 1909479, filed Aug. 28, 2019, the contents of which are incorporated herein by reference. The PCT International Application was published in the French language.

BACKGROUND OF THE INVENTION

The present invention relates to a flexible fluid transport pipe, comprising:
- a tubular polymeric sheath delimiting a central axis fluid circulation passage;
- a pressure vault, arranged around and outside the tubular sheath, the pressure vault comprising a short-pitch winding of at least one interlocked shaped wire, the shaped wire comprising a plurality of interlocked turns, each turn having a profile, in section in a median axial plane, defining at least one stud and a groove for the or each stud, adjacent to the stud, the stud being suitable for being interlocked into a groove of an adjacent turn of a shaped wire of the pressure vault
- at least one armor layer arranged on the outside of the pressure vault.

The flexible pipe is as described in the normative documents published by the American Petroleum Institute (API), API 17J, 4th edition—May 2014 and API RP 17B, 5th edition—March 2014, for example.

Such flexible pipes are used in particular as production lines, water or gas injection lines, gas export lines, service lines, especially deep underwater in the oil and gas industry. They generally extend across a body of water between a surface facility and a bottom assembly or between two bottom assemblies. These lines can also extend between two surface facilities.

Examples of the surface facility include a barge, a semi-submersible platform, a Floating Production Storage and Offloading (FPSO), a Floating Liquefied Natural Gas (FLNG), a Floating Storage Unit (FSU), or other floating assembly.

The flexible pipes typically have an outer protective sheath defining an inside volume and at least one liquid-impermeable inner liner arranged inside the inner volume. The inner sheath is typically a pressure sheath defining a fluid flow passage.

The fluid transported by this type of pipe is, in particular, a mixture of hydrocarbons that may contain a high content of corrosive gases such as carbon dioxide ($CO_2$) and/or hydrogen sulfide ($H_2S$).

The outer protective sheath and the inner sheath define an annular space between them, generally receiving at least one metal reinforcement layer.

The metal reinforcement layer comprises a pressure vault, for example, formed by a winding of a metal profile wire, arranged and interlocked around the pressure sheath. The profile is interlocked in such a way as to limit the pressure sheath creeping under the effect of the internal pressure.

The metal reinforcement layer also comprises layers of tensile armors formed by layers of metal wires arranged around the pressure vault in the annular space to provide good tensile strength.

The annular space containing the pressure vault and the tensile armor layers is generally subjected to acidic gases from the transported fluids that diffuse through the inner liner. The partial pressure of these acid gases within the annular space is sometimes in relatively high.

In the presence of water, which can come from the water contained in the transported hydrocarbons that have migrated through the inner sheath into the annular space, or from the water surface in the event of a tear in the outer sheath, the metal armor layers located in this annular space, in particular the pressure vault and the tensile armor layers, are subject to corrosion.

This can lead to a loss of integrity of the mechanical properties of the pipe, depending on the severity of the environment in the annular space, and eventually ruin it.

In addition, the combination of the corrosive environment related to mechanical loads (from manufacturing steps and operational loads) can lead to stress corrosion cracking (SCC).

Due to the interlocking of the pressure vault, a significant amount of corrosive gases can accumulate in the annular space inside the pressure vault. This makes the medium between the sheath liner and the pressure vault particularly corrosive.

In some cases, in the presence of a pressure vault, the partial pressure of carbon dioxide under the pressure vault is likely to increase significantly, typically by a factor of three compared to a hose without a interlocked pressure vault, or even more in some critical cases. This can lead to local stress corrosion phenomena for the pressure vault and result in ruining it.

SUMMARY OF THE INVENTION

An object of the invention is therefore to provide a flexible fluid transport line, which is suitable for transporting corrosive fluids, but which has an improved service life, in particular at the pressure vault.

To this end, the invention has as its subject matter a flexible pipe of the aforementioned type, characterized in that at least one additional gas circulation passage through the pressure vault, from the inside of the pressure vault to the outside of the pressure vault, is defined in the or each stud and/or in the bottom of the or each groove, the additional passage making gas circulation possible between the inside of the pressure vault and the outside of the pressure vault in addition to at least one clearance between the stud of one turn and the bottom of the groove of the adjacent turn, or in the absence of clearance between the stud of one turn and the bottom of the groove of the adjacent turn.

The flexible pipe according to the invention may comprise one or more of the following features, taken alone or in any technically possible combination:
- the profile of each turn defines, in section in a median axial plane, a stud and a groove adjacent to the stud, the stud being suitable for being interlocked into a groove of an adjacent turn of a pressure vault shaped wire, the profile of each turn defining, in section in a median axial plane, an additional stud and an additional groove adjacent to the additional stud, the additional stud being suitable for being interlocked into a groove of an adjacent opposite turn of a wire of the pressure vault, located opposite the adjacent turn, at least one additional passage for gas circulation through the pressure vault from the inside of the pressure vault to the outside of the pressure vault being defined in each stud and/or in the bottom of each groove, each additional passage allowing gas circulation between the inside of the pressure vault and the outside of the pressure vault;

the cumulative surface area of the additional passage(s), taken as a projection in a transverse plane, corresponds to the surface area defined by a clearance greater than 0.1 mm between the stud of one turn and the bottom of the groove of the adjacent turn;

the cumulative surface area of the additional passage(s), taken as a projection in a transverse plane, corresponds to the surface area defined by a clearance of between 0.1 mm and 0.3 mm between the stud of a turn and the bottom of the groove of the adjacent turn and is advantageously between 9 mm$^2$ and 262 mm$^2$;

at least one additional passage is formed by a notch made in the or each stud, the notch opens into a free edge of the or each stud, and also opens on one side of the or each stud located opposite the groove, and on a side opposite the or each stud located opposite the groove;

the width of the notch in the or each stud is less than 15% of the perimeter of the free edge of the stud;

the height of the notch is between 10% and 100% of the height of the stud, taken radially in relation to the central axis between the bottom of the groove and the free edge of the stud away from the notch;

at least one additional passage is formed by a through hole in the bottom of the or each groove;

the through hole extends radially through the bottom of the or each groove;

the maximum axial dimension of the through hole, taken in projection on the central axis, is less than the width of the through hole, taken transversely to the central axis;

the maximum axial dimension of the through hole is less than 100% of the maximum axial dimension of the or each groove, the axial dimensions being taken as projected on the central axis; and, the profile of the shaped wire is selected from a Z-, T-, K- and C-shaped cross-sectional profile.

Another subject matter of the invention is a method for manufacturing a flexible pipe, comprising the following steps:

providing a tubular polymeric sheath delimiting a central axis fluid flow passage;

forming a pressure vault around the tubular sheath, the formation comprising a short-pitch winding and interlocking of at least one shaped wire, the shaped wire comprising a plurality of interlocked turns, each turn having a profile, in section in a median axial plane, defining at least one stud and a groove adjacent to the stud, for the or each stud, the stud being adapted to be interlocked into a groove of an adjacent turn of a shaped wire of the pressure vault;

providing at least one armor layer outside the pressure vault, characterized in that at least one additional passage for gas circulation through the pressure vault from the inside of the pressure vault to the outside of the pressure vault is defined in the or each stud and/or in the bottom of the or each groove, the additional passage allowing gas circulation from the inside of the pressure vault to the outside of the pressure vault in addition to at least one clearance between the stud of one turn and the bottom of the groove of the adjacent turn, or in the absence of clearance between the stud of one turn and the bottom of the groove of the adjacent turn.

The method according to the invention may comprise one or more of the following features, taken alone or in any technically feasible combination:

the or each additional flow passage is formed by making a notch in the or each stud and/or by making a through hole through the bottom of the or each groove.

It is also a subject matter of the invention to use a flexible pipe as defined above for transporting fluid through the fluid circulation passage, the use comprising diffusing a gas contained in the fluid through the tubular sheath and then through the pressure vault, passing through the or each additional passage, from the inside of the pressure vault to the outside of the pressure vault.

DESCRIPTION OF THE DRAWINGS

The invention will be better understood from the following description, given by way of example only, and made with reference to the appended drawings, in which.

DESCRIPTION OF EMBODIMENTS

Figure 1:
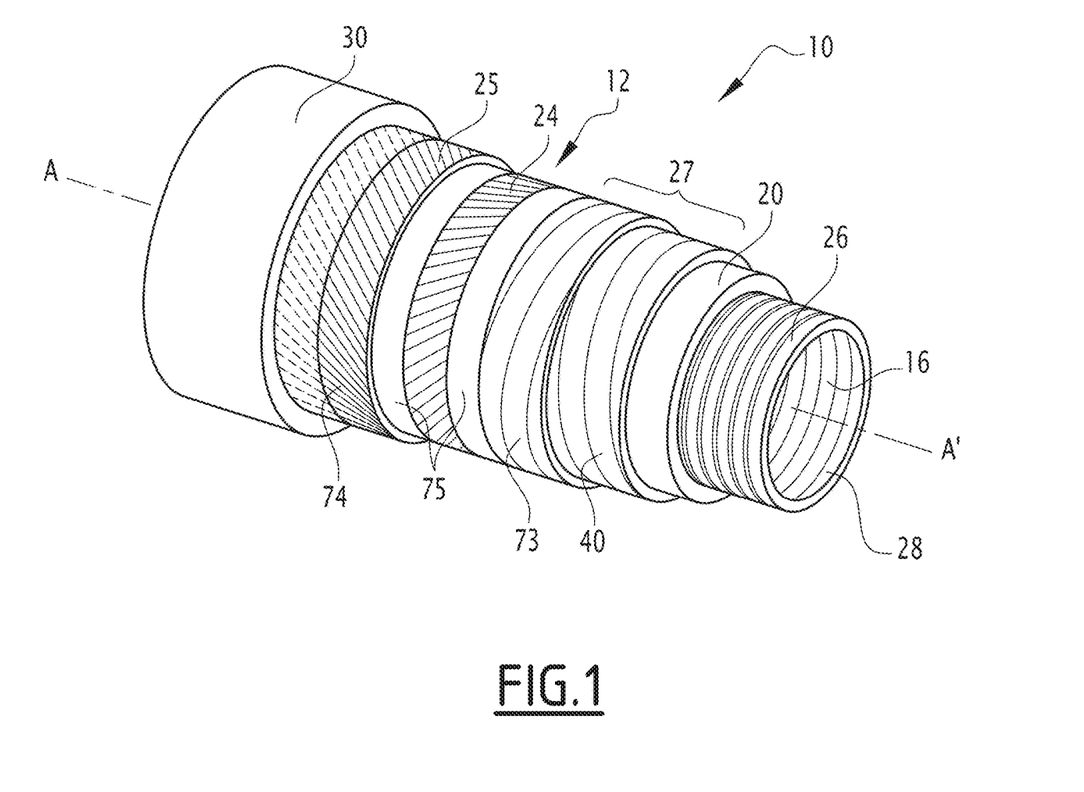
FIG. 1 is a partially exposed perspective view of a central section of a first flexible pipe according to the invention.

A first flexible pipe 10 according to the invention is partly illustrated in FIG. 1.

The flexible pipe 10 comprises a central section 12. It comprises an end fitting (not visible) at each of the axial ends of the central section 12.

With reference to FIG. 1, the pipe 10 delimits a central passage 16 for the circulation of a fluid, advantageously a petroleum fluid. The central passage 16 extends along a central axis A-A', between the upstream end and the downstream end of the pipe 10.

The flexible pipe 10 is intended to be arranged across a body of water (not shown) in a facility for the exploitation of fluid, in particular hydrocarbons.

The body of water is a sea, a lake or an ocean, for example. The depth of the water body at the fluid exploitation facility is between 50 m and 4000 m, for example.

The fluid exploitation facility comprises a surface assembly, in particular a floating assembly, and a bottom assembly (not shown), which are generally connected to each other by the flexible pipe 10.

The flexible pipe 10 is preferably an unbonded pipe.

At least two adjacent layers of the flexible pipe 10 are free to move longitudinally in relation to each other when the pipe is flexed. Advantageously, all layers of the flexible pipe are free to move in relation to each other.

Such a pipe is described in the normative documents published by the American Petroleum Institute (API), API 17J, 4$^{th}$ edition—May 2014 and API RP 17B, 5$^{th}$ edition—March 2014, for example.

Furthermore, throughout the following, the terms "outer" and "inner" are generally understood to be radial to the center axis A-A' of the pipe, with the term "outer" being understood as relatively farther radially from the A-A' axis A-A' and the term "inner" being understood as relatively closer radially to the A-A' axis A-A' of the pipe.

Figure 2:
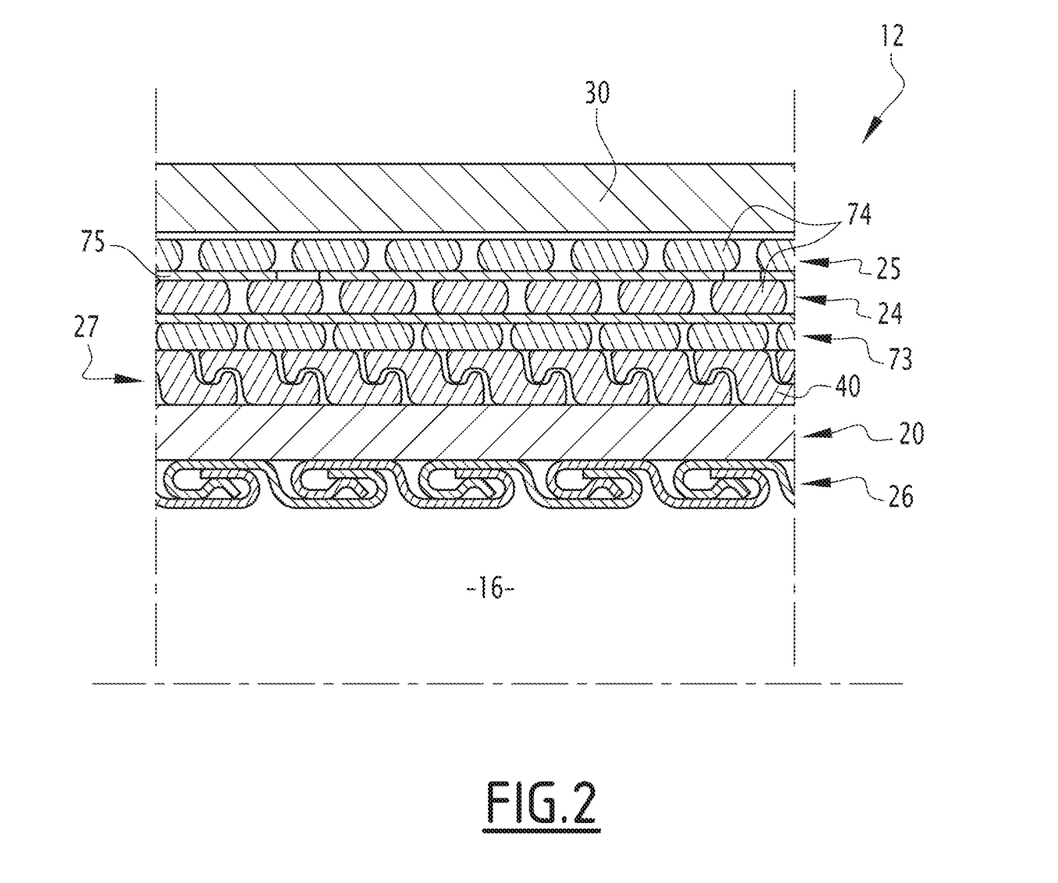
FIG. 2 is a partial view of a detail of the pipe of FIG. 1, taken in section along a median axial plane.

As shown in FIGS. 1 and 2, the pipe 10 defines a plurality of layers concentric about the axis A-A', which extend continuously along the central section 12 to the end fittings at the ends of the pipe (not shown).

According to the invention, the pipe 10 comprises at least a first tubular sheath 20 based on a polymer material, advantageously constituting a pressure sheath.

The pipe 10 further comprises at least one layer of tensile armor 24, 25 arranged externally in relation to the first sheath 20 forming a pressure sheath.

The pipe 10 further optionally includes an internal carcass 26 arranged within the pressure sheath 20.

The pipe 10 comprises a pressure vault 27 interposed between the pressure sheath 20 and the tensile armor layer(s) 24, 25, and an outer sheath 30, intended to protect the pipe 10.

As known, the pressure sheath 20 is intended to confine the fluid transported in the passage 16 in a sealed manner. Advantageously, the pressure sheath 20 is formed of a polymer material. The polymer is based on a polyolefin such as polyethylene or polypropylene, for example, based on a polyamide such as PA11 or PA12, or based on a fluorinated polymer such as polyvinylidene fluoride (PVDF).

In a variant, the pressure jacket 20 is formed based on a high performance polymer such as a polyaryletherketone (PAEK) such as polyetherketone (PEK), polyetheretherketone (PEEK), polyetheretherketoneketone (PEEKK), polyetherketoneketone (PEKK) or polyetheretherketoneketoneketone (PEKEKK), polyamideimide (PAI), polyetherimide (PEI), polysulfone (PSU) polyphenylsulfone (PPSU), polyethersulfone (PES), polyarylsulfone (PAS), polyphenylene ether (PPE), polyphenylene sulfide (PPS), liquid crystal polymers (LCP), polyphthalamide (PPA) fluorinated derivatives such as polytetrafluoroethylene (PTFE), perfluoropolyether (PFPE), perfluoroalkoxy (PFA) or ethylene chlorotrifluoroethylene (ECTFE) and/or mixtures thereof The thickness of the pressure jacket 20 is between 5 mm and 20 mm, for example.

The carcass 26, when present, is formed of a profiled metal strip 28, wound in a helix. The successive turns of the strip are interlocked to each other.

The main function of the carcass 26 is to absorb the radial crushing forces. The radial crushing forces are generated by the hydrostatic pressure of the water body, for example, or by the installation equipment during installation of the pipe.

The carcass 26 is arranged inside the pressure sleeve 20 and is suitable for contact with the fluid flowing in the pressure sleeve 20.

The flexible pipe 10 is then referred to as a "rough bore" because of the geometry of the carcass 26.

In a variant (not shown), the flexible pipe 10 has no internal carcass and is referred to as a "smooth bore".

With reference to FIG. 1, the pressure vault 27 is intended to take up the forces related to the pressure prevailing inside the pressure sheath 20. It is formed of at least one metal profiled wire 40 interlocked and wound helically around the pressure sheath 20, for example.

The metal material forming the profiled wire 40 is selected from carbon steel, in particular selected from carbon steel grades of between 0.1% and 0.8% carbon. For applications in particularly corrosive environments, the metal material is selected from stainless steels such as duplex steels.

The pressure vault 27 is helically wound with a short pitch around the pressure sheath 20, i.e. with a helix angle of absolute value close to 90° in relation to the axis A-A', typically between 75° and 90°. The shaped wire 40 generally has a complex geometry, here with a Z or Zeta shaped profile.

The shaped wire 40 has a plurality of interlocking turns 42. Each turn 42 corresponds to a 360° winding about the axis A-A'. It has a cross-sectional Z or Zeta profile in a median axial plane passing through the axis A-A'.

Figure 3:
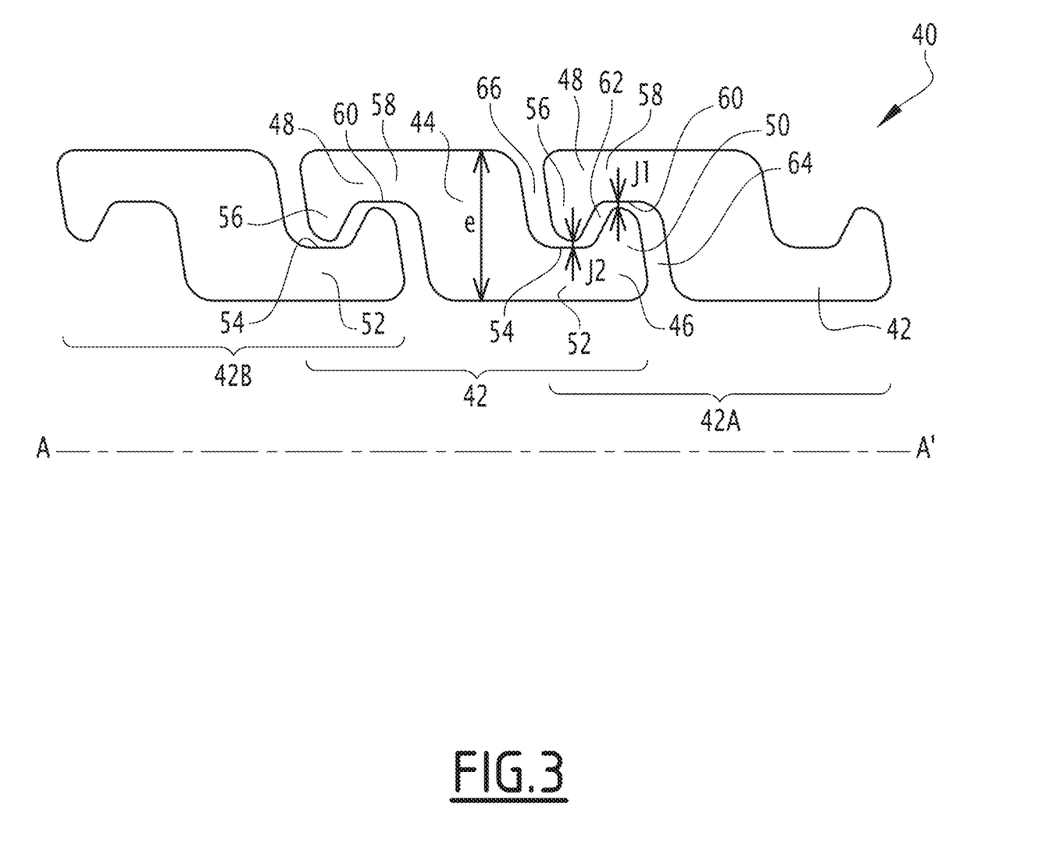
FIG. 3 is a cross-sectional view illustrating the pressure vault and the clearances between successive turns of the vault.
Figure 4:
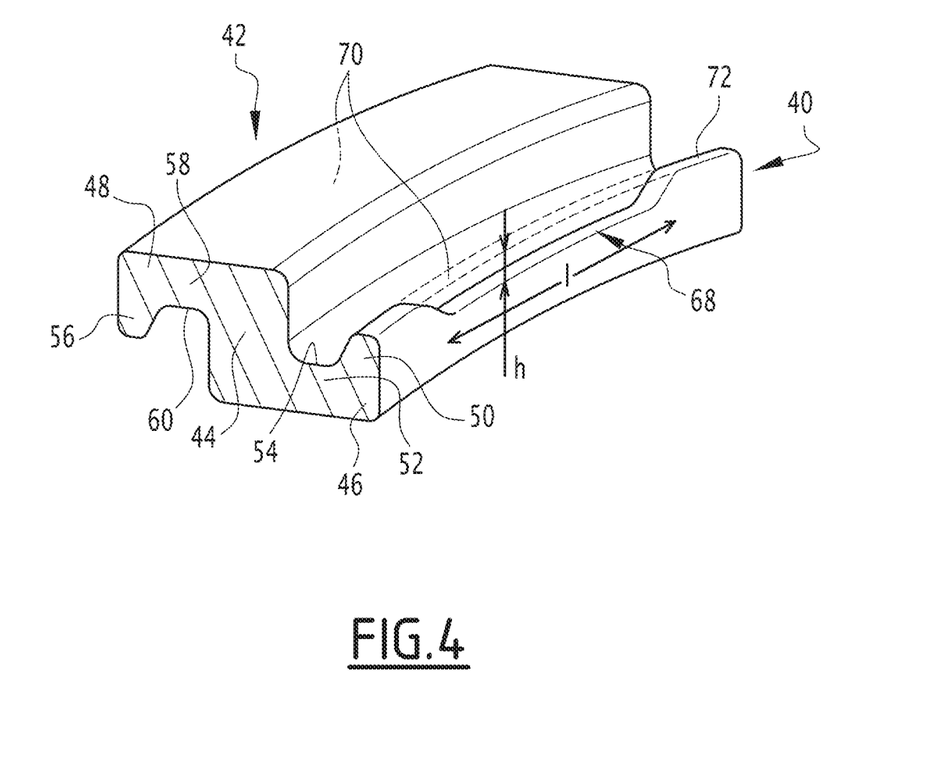
FIG. 4 is a partial view of a turn of a pressure vault of a first pipe according to the invention.

With reference to FIGS. 3 and 4, the profile defined by each turn 42 has a solid central portion 44 of thickness e, a first inner end portion 46 projecting from the central portion 44 into an inner region of the central portion 44, and an outer end portion 48 projecting from an outer region of the central portion 44, axially opposite the inner end portion 46.

The inner end portion 46 has an inner stud 50 at its free edge, projecting radially outwardly. It defines an inner groove 52 between the stud 50 and the central portion 44, delimited inwardly by a bottom 54.

Conversely, the outer end portion 48 includes an additional inwardly projecting outer stud 56 at its free edge. The additional stud 56, with the central portion 44, defines an additional outer groove 58, bounded outwardly by an additional bottom 60.

In the median axial plane passing through the axis A-A', the stud 50 of each turn 42 is thus interlocked into the additional groove 58 of a first adjacent turn 42A, received in the groove 58 against the bottom 60 of the groove 58.

Similarly, the additional stud 56 of each turn 42 interlocks into the groove 52 of a second adjacent turn 42B axially opposite the first adjacent turn 42A.

As illustrated in FIG. 3, the stud 50 of the turn 42, with the bottom 60 of the groove 58 of the adjacent turn 42A, defines a first helical radial clearance J1 allowing the passage of gas from the inside of the pressure vault 27 to the outside of the pressure vault 27.

Similarly, the bottom 54 of the groove 52 of the turn 42, with the additional stud 56 of the adjacent turn 42A, defines a second helical radial clearance J2 allowing the passage of gas from the inside of the pressure vault 27 to the outside of the pressure vault 27.

The radial clearances J1 and J2 are connected to each other by an inclined gap 62 between the opposing pins 50 and 56.

The clearance J1 is connected to the space inside the pressure vault 27 toward the axis A-A' by an inner channel 64, present between the stud 50 of the turn 42 and the central portion 44 of the adjacent turn 42A.

The inner channel 64 opens inwardly opposite the pressure sheath 20, and thus receives gases diffusing from the inside of the pipe 16 through the pressure sheath 20.

The clearance J2 is connected to the space outside the pressure vault 27 in relation to the axis A-A' by an external channel 66 present between the additional stud 56 of the adjacent turn 42A and the central portion 44 of the turn 42. The outer channel 66 opens outwardly opposite the armor layers 24, 25.

The inner 64 and outer 66 channels are defined by the gaps between the profiles of the turns 42 and 42A. The clearance J1 thus ensures the passage of gases between the inner channel 64 and the gap 62. Similarly, the clearance J2 ensures the passage of gases between the interstice 62 and the external channel 66.

During the manufacturing of the pressure vault 27, it is checked that the profiled wires 40 are laid with pitch tolerances ("pitch" according to API 17J) such that the pipe 10 has a minimum storage radius ("SR" or "Storage Radius" according to API 17J) having a tolerance margin of 10% in relation to its locking radius ("LR" or "Locking Radius" according to API 17J). Thus, once the pipe 10 is in service, there is always a gap 62 and non-zero channels 64 and 66.

For reasons of manufacturing tolerances of the turn profiles 42, or during the manufacturing steps of the pipe 10 or when internal and/or external radial pressure forces are exerted on the pressure vault 27, a phenomenon of tiling between adjacent turns 42, 42A, 42B or a phenomenon of deformation of the profiles sometimes occurs. This may result in a radial incline in relation to the axis A-A' of a turn 42, 42A, 42B, of the shaped wire 40 in relation to an adjacent turn 42, 42A, 42B of the shaped wire 40 resulting in one of the studs 50, 56 of a turn 42, 42A, 42B contacting the bottom 60, 54 of one of the grooves 58, 52 of the adjacent turn 42, 42A, 42B.

At least one clearance J1 and/or J2 is then zero and thus the channels 64, 66 no longer interact with the interstice 62. Thus, in a prior art pipe, the passage of gases through the pressure vault interlock 27 is completely blocked.

With reference to FIG. 4, in a pipe 10 according to the invention, the studs 50, 56 of the turn 42 define at least one additional passage 68, preferably at least one additional gas circulation passage 68 per stud 50, 56 adding to the helical clearance J1 and J2.

As illustrated in FIG. 4, each additional passage 68 is here defined by a notch 70 formed in the free edge 72 of each stud 50, 56.

Each notch 70 opens radially outwardly or inwardly, respectively, depending on whether it is on the respective stud, 50 or 56. They open axially into the gap 62 and into one of the channels 64, 66 so as to guarantee a passage of gas from the inside to the outside of the layer 40 whatever the size of the clearances J1 and J2, and even if these are completely closed.

As illustrated in FIG. 4, each notch 70 extends only along a portion of the circumference of the respective stud 50, 56 about the central axis A-A'.

Figure 10:
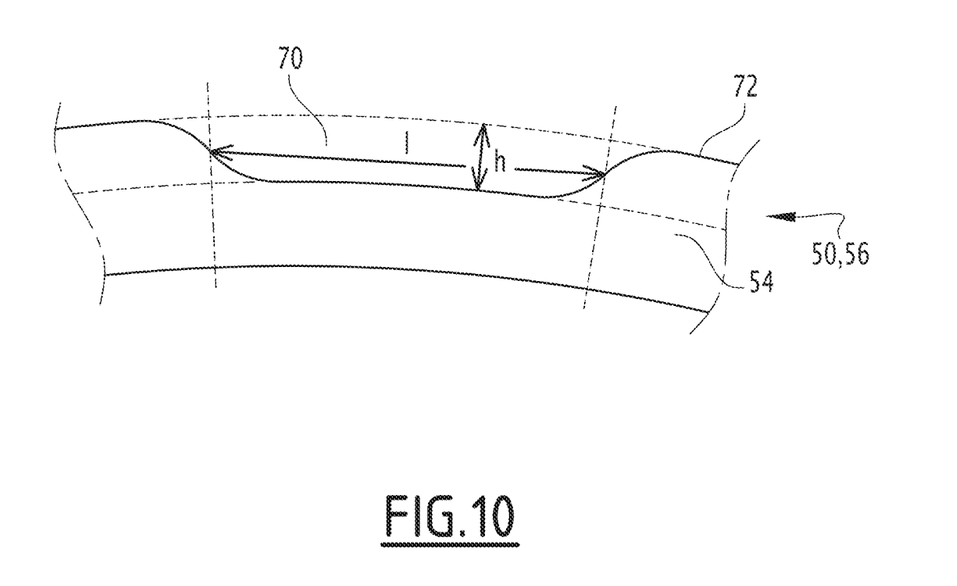
FIG. 10 is a front view of the profile of a notch in a stud of a vault according to the invention.

With reference to FIG. 10, projected in a transverse plane perpendicular to the axis A-A', the width l of the notch 70, taken between the points of inflection of the edges of the notch 70 is advantageously less than 15% of the perimeter of the free edge 72 of the respective stud 50, 56. In a variant, the width l is increased depending on the passage surface requirements, which depend on the gas circulation rates to be considered.

The maximum height h of the notch 70, taken radially in relation to the axis A-A', is between 10% and 100% of the height of the stud, taken radially in relation to the central axis A-A' between the bottom 54 of the groove 52 and the free edge 72 of the stud 50 respectively, or between the bottom 60 of the groove 58 and the free edge 72 of the stud 56 away from the notch 70.

For each turn 42, the surface of each additional passage 68, taken in projection in a transverse plane perpendicular to the axis A-A', preferably corresponds to the surface defined by a clearance J1 or J2 of at least 0.1 mm, in particular greater than 0.2 mm, in particular between 0.1 mm and 0.3 mm. In a variant, this passage surface is adapted on a case-by-case basis depending on the gas circulation to be considered.

Examples of possible dimensions for the additional passage 68 are described in the table below, corresponding to Z thicknesses profiles equal to 6.2 mm, 8 mm, 10 mm and 12 mm for internal diameters of vault 27 between 56 mm and 550 mm respectively, for a guaranteed minimum passage surface corresponding to a clearance J1 and J2 of 0.2 mm.

TABLE 1

|  | $S_{min}$ (mm) | $S_{max}$ (mm) | $S_{moy}$ (mm) | Max h (mm) | Max l (mm) | Max S (mm²) |
| --- | --- | --- | --- | --- | --- | --- |
| Zeta 6.2 | 19 | 73 | 46 | 1.5 | 68.4 | 100 |
| Zeta 8 | 30 | 105 | 67 | 1.9 | 100.2 | 188 |
| Zeta 10 | 33 | 149 | 91 | 2.3 | 135.9 | 318 |
| Zeta 12 | 50 | 175 | 113 | 2.8 | 167.8 | 471 |

Smin, Smax and Smoy correspond to the minimum, maximum and average surface of a 0.2 mm J1 and J2 clearance for internal vault diameters 27 of between 56 mm and 550 mm, respectively. Max h and Max l correspond to examples of the maximum height and width of the notch 70, respectively. Max S is the area of the additional passage surface defined by the notch 70.

The Max S surfaces, of between 100 mm² to 471 mm² depending on the profile size, are always much larger than the average areas shown by the clearances J1 or J2 of 0.2 mm.

Thus, even if a blocking effect occurs, linked to the complete interlocking of the pressure vault 27, and in particular to the insertion of the respective studs 50, 56 into the respective grooves 58, 52, and thus to the disappearance of the clearances J1 and J2, the additional passages 68 defined by the notches 70 in the respective studs 50, 56 provide a passage surface for the gases, and prevent their accumulation inside the pressure vault 27.

This very significantly decreases the partial pressure of corrosive gases within the pressure vault 27, particularly between the pressure vault 27 and the pressure sheath 20. The effect of the tortuosity then becomes controllable.

The flexible pipe 10 optionally comprises a hoop 73, partially visible in FIGS. 1 and 2.

The hoop 73, when present, consists of a spiral winding of at least one wire advantageously of rectangular cross-section around the pressure vault 27. The superposition of several wires wound around the pressure vault 27 advantageously replaces a given total thickness of the hoop 73. This increases the burst strength of the flexible pipe 10. At least one wire is wound with a short pitch about the axis A-A' of the flexible pipe 10, i.e. with a helix angle of absolute value close to 90° in relation to the axis A-A', typically between 75° and 90°.

The flexible pipe 10 according to the invention comprises at least one armor layer 24, 25 formed of a helical winding of at least one elongated armor element 74.

In the example shown in FIG. 1, the flexible pipe 10 includes a plurality of armor layers 24, 25, including an inner armor layer 24, applied to the pressure vault 27 or the hoop 73, when present, and an outer armor layer 25 around which the outer sheath 30 is arranged.

Each armor layer 24, 25 has longitudinal armor elements 74 wound with a long pitch about the axis A-A' of the pipe.

"Wound with a long pitch" means that the absolute value of the helix angle in relation to the axis A-A' is less than 60°, and is typically between 10° and 60°, particularly between 25° and 55°.

The armor elements 74 of a first layer 24 are wound generally at an opposite angle to the armor elements 74 of a second layer 25. Thus, if the winding angle of the armor elements 74 of the first layer 24 is equal to +α, with a being between 10° and 60°, the winding angle of the armor elements 74 of the second armor layer 25 arranged in contact with the first armor layer 24 is equal to −α°, for example.

The armor elements 74 are formed by metal wires, for example, in particular steel wires, or by tapes of composite material, such as carbon fiber reinforced tapes.

The metal material forming the armor elements 74 is advantageously selected from carbon steel, in particular selected from grades of carbon steel comprising between 0.1% and 0.8% carbon. For applications in particularly corrosive environments, the metallic material is chosen from among stainless steels such as duplex steels.

In this example, each layer of tensile armor 24, 25 advantageously rests on at least one anti-wear strip 75, visible in FIGS. 1 and 2. The anti-wear strip 75 is made of plastic for example, in particular based on a polyamide, a polyvinylidene fluoride (PVDF), a polyphenylsulfone (PPSU) or even a polyetheretherketone (PEEK). It has a thickness less than the thickness of each inner or outer sheath.

Advantageously, a holding tape such as a high strength aramid strip (Technora® or Kevlar®) is wound around the second outermost tensile armor layer 25 in relation to the axis A-A', to ensure mechanical holding of the tensile armor layers 24, 25. In a variant, the aramid fibers are replaced by glass fibers, carbon fibers or basalt fibers.

The outer sheath 30 is intended to prevent the penetration of fluid from the outside of the flexible pipe 10 into the inside, into the annular space between the pressure sheath 20 and the outer sheath 30, and is advantageously made of a polymeric material, in particular based on a polyolefin, such as polyethylene, or based on a polyamide, such as PA11 or PA12.

The thickness of the outer sheath 30 is between 5 mm and 15 mm, for example.

The manufacture of the flexible pipe 10 according to the invention will now be described.

Initially, the dimensions of the pressure vault 27 are determined. The type of shaped wire 40 is selected, and depending on the desired pressure vault diameter 27, the number and size of the additional flow passages are determined from the value of the flow surface that a clearance J1 and J2 of the order of 0.2 mm would have, and may be adapted, i.e. increased or decreased depending on the gas circulation rate to pass through the pressure vault 40.

Each notch 70 is then made in a stud 50, 56, with the surface corresponding to the minimum clearance determined, this surface being able to vary between 5 mm² and 450 mm², in particular between 15 mm² and 300 mm², preferably between 19 mm² and 175 mm².

Each notch 70 is made by grinding, drilling, or/and hot rolling of the shaped wire 40, preferably. In a variant, especially for a non-hot rolled shaped wire 40, local induction heating is used to make the notch 70 in the stud 50, 56.

Then, the pressure sheath 20 is provided, by being extruded, for example. The shaped wire 40, here provided with the notches 70, is then wound at a short pitch around the pressure sheath 20, interlocking the respective studs 50, 56 into the respective grooves 58, 52, and ensuring that the manufacturing pitches are within the recommended tolerances so as to ensure a gap 62 and non-zero channels 64, 66, Thereafter, the armor layers 24, 25 are positioned and the outer sheath 30 is provided around the armor layers 24, 25, for example by extrusion.

In use, during the flow of fluid through the central passage 16 of the pipe, corrosive gas is likely to diffuse through the pressure sheath 20, and reach the annular space between the pressure sheath 20 and the outer sheath 30 and more precisely the space between the pressure vault 27 and the pressure sheath 20.

These gases flow successively through the inner channel 64, into the notches 70 of the stud 50 facing the groove 58 and into the first clearance J1 between the stud 50 and the groove 58 when this clearance is present, into the gap 62, into the notches 70 of the stud 56 facing the groove 52 and into the second clearance J2 between the stud 56 and the groove 52 when this clearance is present, and finally into the outer channel 66.

Even if the interlocking of the pressure vault 27 leads to a blocking effect, linked to the reduction or disappearance of the clearances J1 and/or J2, the presence of the additional passages 68 formed by the notches 70 guarantees the passage of the gases, preventing the abnormal increase in the partial pressure of the corrosive gases inside the pressure vault 27 and thus strongly limiting the phenomena of corrosion, and in particular stress corrosion cracking (SCC).

Figure 5:
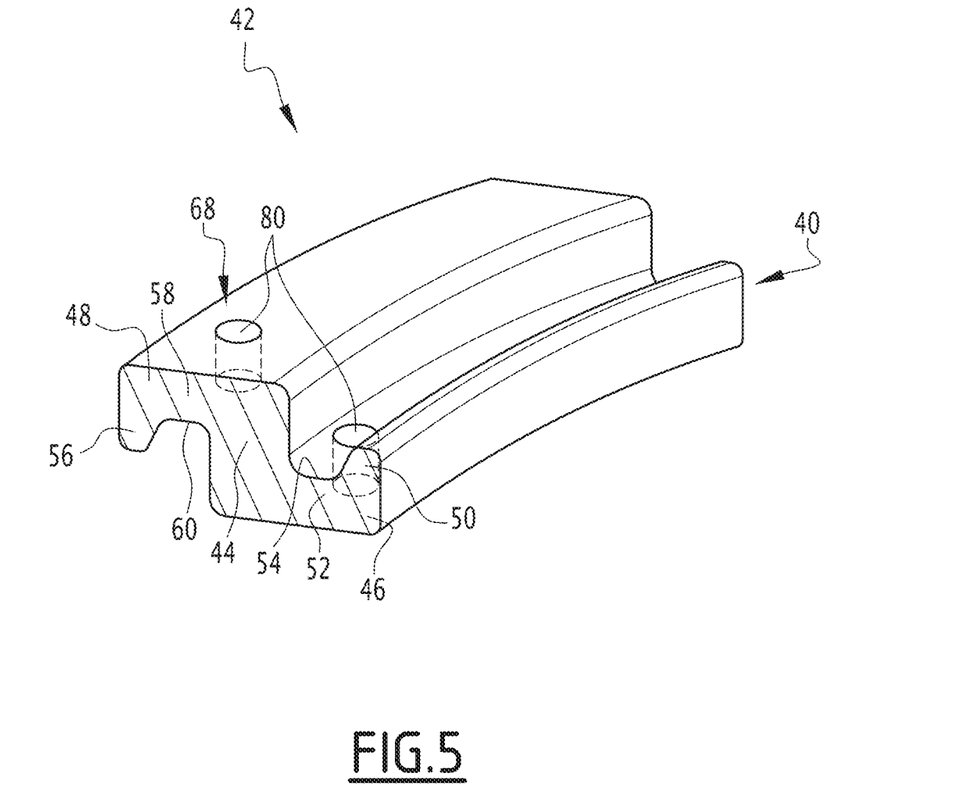
FIG. 5 is a view analogous to FIG. 4 of a flexible pipe variant according to the invention.

In the embodiment shown in FIG. 5, at least one additional gas circulation passage 68 is formed by a through hole 80 formed in the bottoms of the additional grooves 58, 52. A through hole 80 here extends radially through the bottom 60, 54 of each groove 58, 52. The holes 80 open radially inward into the groove 58, 52, and radially outward away from the groove 58, 52.

Figure 11:
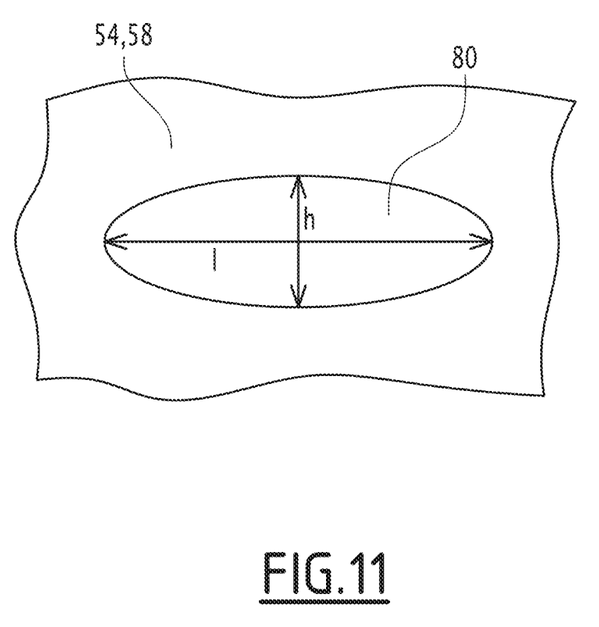
FIG. 11 is a view of the contour of a through hole provided in the bottom of a groove of a pressure vault according to the invention.

The dimensions h and l of hole 80 are shown in FIG. 11. The maximum axial dimension h of the through hole 80 is between 10% and 100% of the width of the groove 58, 52. The dimension h and the width of the groove 58, 52 are taken in projection on the axis A-A'.

Similarly, the length l of the through hole 80, taken in projection on an axis perpendicular to the axis A-A' is advantageously less than the maximum clearance between the turns used for the creep sizing of the pressure sheath 20, and is determined based on the gas circulation rate to pass and based on the number of holes drilled on a circumference.

The through hole 80 is preferably oblong in shape, being elongated in the circumferential direction.

Advantageously, depending on the desired additional gas passage surface, the number of through holes 80 provided in each groove 58, 52 is greater than 2 through holes 80 per turn 42, and in particular between 2 and 10 through holes 80 per turn 42, for profile sizes with thicknesses of between 6.2 mm and 12 mm and internal installation diameters of between 50 mm and 550 mm.

Examples of through hole sizes 80 are given in the table below for Z-profiles with thicknesses of 6.2 mm, 8 mm, 10 mm and 12 mm respectively.

TABLE 2

| | Lmax hole (mm) | hmax hole (mm) | Shole (mm2) |
|---|---|---|---|
| Z 6.2 mm | 2.0 | 1.3 | 8.5 |
| Z 8 mm | 2.6 | 1.7 | 14.1 |

TABLE 2-continued

|  | Lmax hole (mm) | hmax hole (mm) | Shole (mm2) |
|---|---|---|---|
| Z 10 mm | 3.3 | 2.2 | 22.1 |
| Z 12 mm | 3.9 | 2.6 | 31.8 |

The through holes 80 are drilled through the grooves 58, 52, for example.

The operation of this flexible pipe variant is otherwise similar to that described in FIG. 1.

Figure 6:
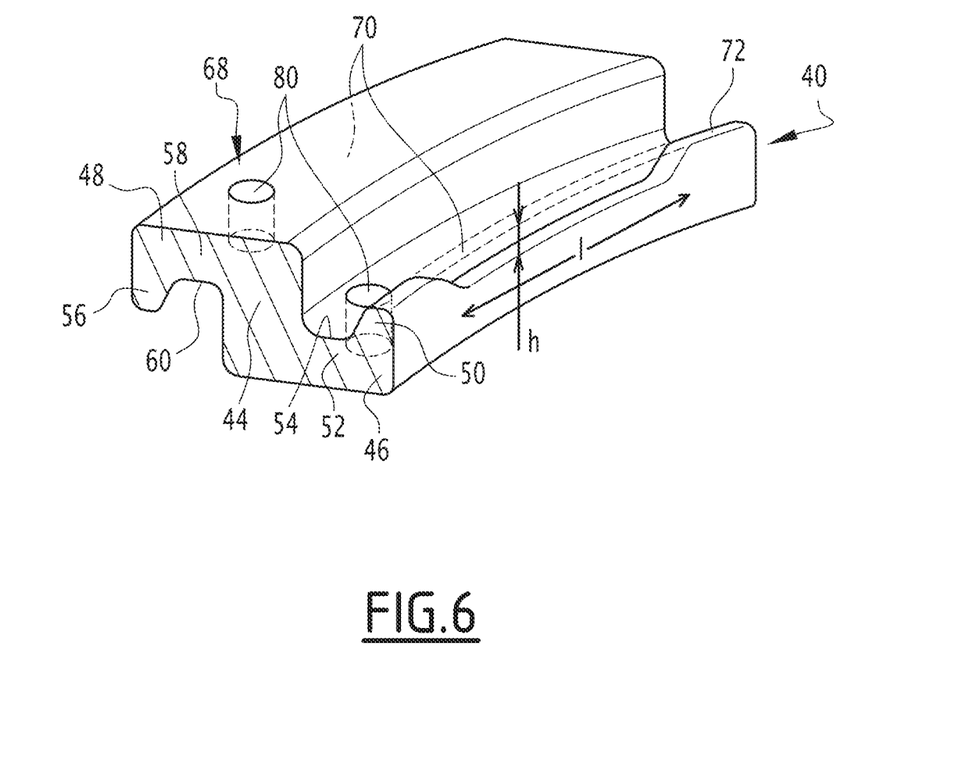
FIG. 6 is a view analogous to FIG. 4 of a flexible pipe variant according to the invention.

In an embodiment shown in FIG. 6, the shaped wire 40 has at least one additional passage 68 for each turn 42, in the form of a notch 70, and at least one additional passage 68 in the form of a hole 80, supplementing the notches 70.

In one embodiment, not shown, only one of the studs 50, 56 is provided with notches 70, the other stud 56, 50 being without notches 70.

In another embodiment, not shown, only one groove 52, 58 is provided with at least one through hole 80, the other groove 58, 52 being devoid of through holes 80.

In other embodiments, not shown, smaller waves or successions of notches 70 are provided on the studs 50, 56.

More generally, at least one turn of the pressure vault 27 has a T-, U-, K-, X- or I-shaped geometry profile.

Figure 7:
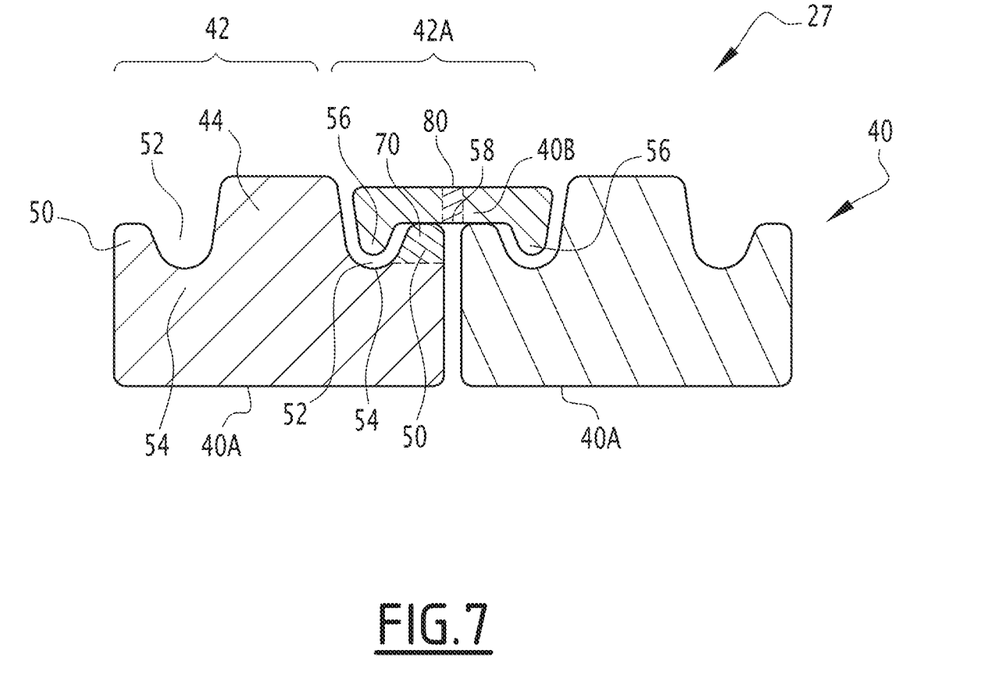
FIG. 7 is a view of interlocked sections of pressure vaults of a flexible pipe variant according to the invention.

Thus, in one embodiment shown in FIG. 7, the pressure vault 27 is formed of a plurality of shaped wires 40A, 40B, of different cross-sectional profiles, interlocked together.

In this example, at least one shaped wire 40A has a T-shaped profile and defines two outwardly projecting inner studs 50, on either side of the central region 44, and an intermediate groove 52 for each stud 50, between the stud 50 and the central region 44.

The shaped wire 40A is interlocked with another shaped wire 40B (generally referred to as a clip) of U-shaped profile. The U-shaped profile includes an additional groove 58, and additional outer studs 56 projecting inwardly on either side of the additional groove 58.

Each stud 50 of a turn 42 of the shaped wire 40A is received in the additional groove 58 of an adjacent turn of the shaped wire 40B. Similarly, each additional stud 56 of a turn 42A of the shaped wire 40B is received in the groove 52 of a turn 42 of the shaped wire 40A.

Here, at least one additional gas circulation passage 68 is provided in the form of a notch 70 in one of the studs 50 of a turn of the shaped wire 40A, and/or in the form of a through hole 80 in the bottom 58 of a turn of the shaped wire 40B, advantageously in a central position.

Figure 8:
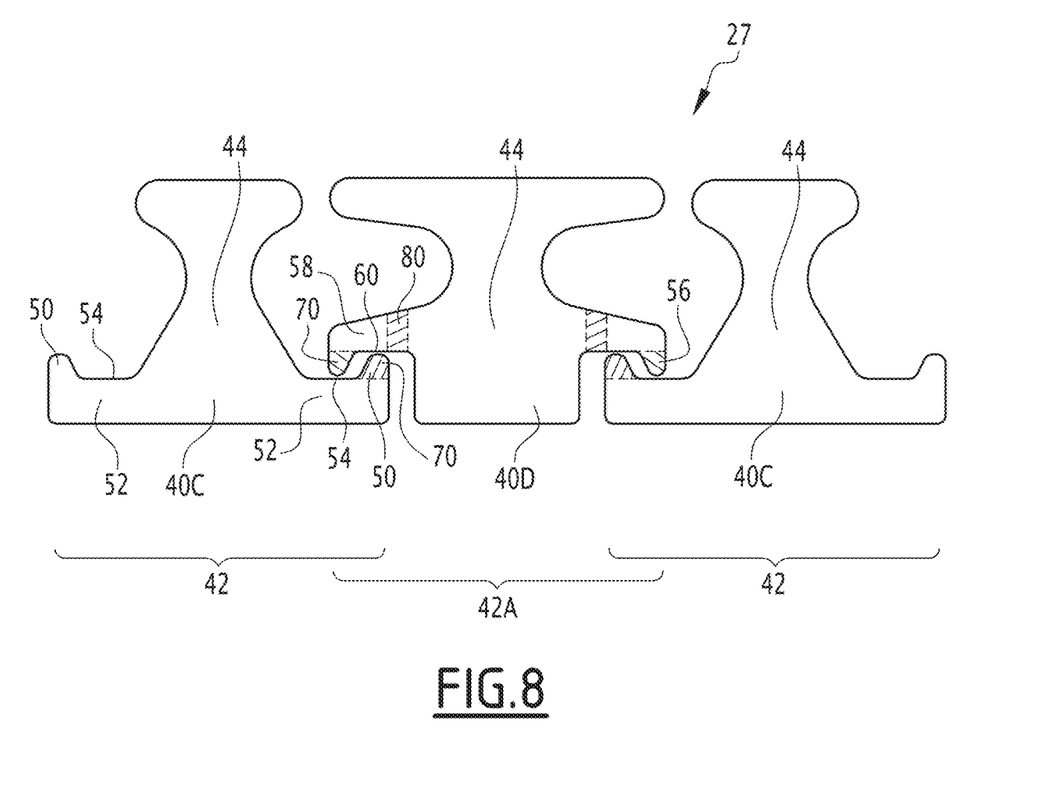
FIG. 8 is a view of interlocked sections of pressure vaults of a flexible pipe variant according to the invention.

In the embodiment shown in FIG. 8, at least one shaped wire 40C has a T-shaped profile and at least one shaped wire 40D has a K-shaped profile.

The profile of the shaped wire 40C defines an inner stud 50 and an inner groove 52 between the stud 50 and the center portion 44.

Similarly, the additional shaped wire 40D defines an outer additional stud 56 and an outer additional groove 58 between the additional stud 56 and the central portion 44.

Each stud 50 of a turn 42 of the shaped wire 40C is received in the additional groove 58 of an adjacent turn 42A of the shaped wire 40D. Similarly, each additional stud 56 of an adjacent turn 42 of the shaped wire 40D is received in the groove 52 of the turn 42 of the shaped wire 40C.

As previously described, an additional gas circulation passage 68 is provided in the form of a notch 70 in the studs 50, 56, or/and in the form of a through hole 80 in the bottom 60 of the two grooves 58 of the shape 40D.

Figure 9:
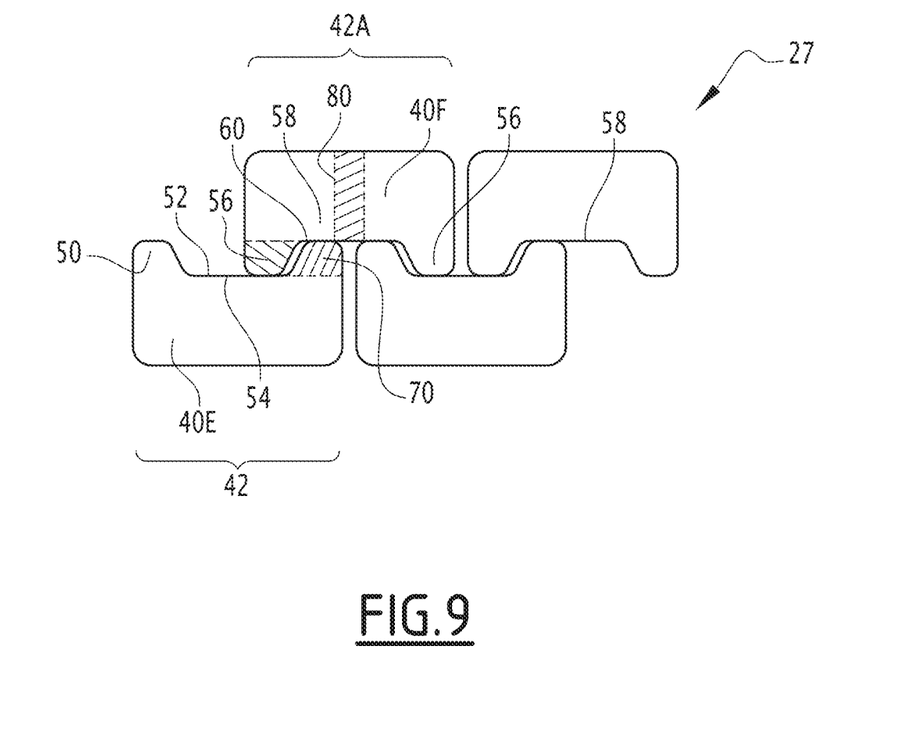
FIG. 9 is a view of interlocked sections of pressure vaults of a flexible pipe variant according to the invention.

In the embodiment shown in FIG. 9, the wire form 40E has a U-shaped profile opening radially outwardly and the wire form 40F, interlocked with the wire form 40E, has a C-shaped profile opening radially inwardly.

The profile of the shaped wire 40E delimits a central groove 52 and has two inner studs 50 projecting outwardly on either side of the groove 52.

The shaped wire profile 40F has an additional groove 58 and on either side of the additional groove 58, two additional outer studs 56 projecting inwardly from the additional groove 58.

Each stud 50 of the shaped wire 40E is received in an additional groove 58 of the shaped wire 40F, and each additional stud 56 of the shaped wire 40F, is received in a groove 52 of the shaped wire 40E.

As previously described, at least one additional gas circulation passage 68 is provided as a notch 70 in the studs 50, 56 or as a through hole 80 in the bottom 60 of the groove 58 of the profile 40F, advantageously in the middle thereof.

The invention claimed is:

1. A flexible fluid transport pipe comprising:
a tubular sheath made of polymer, the tubular sheath defining a fluid circulation passage with a central axis;
a pressure vault, arranged around and outside the tubular sheath, the pressure vault comprising a short-pitch winding of at least one interlocked shaped wire, the shaped wire comprising a plurality of interlocked turns, each turn having a profile, in section in a median axial plane, defining at least one stud and, for the at least one stud, a groove adjacent to the at least one stud, the at least one stud being capable of being interlocked in an adjacent groove of an adjacent turn of a shaped wire of the pressure vault;
at least one armor layer arranged outside the pressure vault; and
at least one additional passage for gas circulation through the pressure vault from the inside of the pressure vault to the outside of the pressure vault, defined in the at least one stud and/or in the bottom of the groove, the additional passage allowing the flow of gas between an inside of the pressure vault and an outside of the pressure vault in addition to at least one clearance between the at least one stud of a turn and the bottom of the adjacent groove of the adjacent turn, or in the absence of clearance between the at least one stud of a turn and the bottom of the adjacent groove of the adjacent turn.

2. The pipe according to claim 1, wherein, in section in the median axial plane, the profile of each turn defines a stud and a groove, adjacent to the stud, the stud being interlocked into an adjacent groove of an adjacent turn of a shaped wire of the pressure vault, the profile of each turn defining an additional stud, in section in the median axial plane, and an additional groove adjacent to the additional stud, the additional stud being capable of being interlocked into an additional adjacent groove of an adjacent turn of a shaped wire of the pressure vault, located opposite the adjacent turn, the pipe comprising at least one additional gas circulation passage through the pressure vault from the inside of the pressure vault to the outside of the pressure vault defined in each stud and/or in the bottom of each groove, each additional passage allowing gas circulation between the inside of the pressure vault and the outside of the pressure vault.

3. The pipe according to claim 1, wherein the cumulative area of the additional passage(s), when projected in a transverse plane, corresponds to the area defined by a clearance greater than 0.1 mm, between the stud of one turn and the bottom of the groove of the adjacent turn.

4. The pipe according to claim 3, wherein the cumulative surface of the additional passage(s), taken in projection in a transverse plane, corresponds to the surface area defined by a clearance of between 0.1 mm and 0.3 mm between the stud of a turn and the bottom of the groove of the adjacent turn.

5. The pipe according to claim 1, wherein at least one additional passage is formed by a notch provided in the at least one stud.

6. The pipe according to claim 5, wherein a width of the notch in the at least one stud is less than 15% of a perimeter of the free edge of the at least one stud.

7. The pipe according to claim 5, wherein a height of the notch is between 10% and 100% of a height of the at least one stud, taken radially in relation to the central axis between the bottom of the groove and the free edge of the at least one stud away from the notch.

8. The pipe according to claim 1, wherein at least one additional passage is formed by a through hole provided in the bottom of the groove.

9. The pipe according to claim 8, wherein the through hole extends radially through the bottom of the groove.

10. The pipe according to claim 8, wherein a maximum axial dimension of the through-hole, taken as projected on the central axis is less than a width of the through-hole, taken transversely to the central axis.

11. The pipe according to claim 8, wherein a maximum axial dimension of the through hole is less than 100% of a maximum axial dimension of the groove, the axial dimensions being taken projected on the central axis.

12. The pipe according to claim 1, wherein the profile of the shaped wire is selected from a Z, T, Ψ, K and C cross-sectional profile.

13. A method for manufacturing a flexible pipe comprising the following steps:
providing a tubular polymeric sheath defining a central axis fluid flow passage;
forming a pressure vault around the tubular sheath, the forming comprising short-pitch winding and interlocking of at least one shaped wire, the shaped wire comprising a plurality of interlocked turns, each turn having a profile, in cross-section in a median axial plane, defining at least one stud and for the at least one stud, a groove adjacent to the stud, the stud being adapted to be interlocked in an adjacent groove of an adjacent turn of a shaped wire;
arranging at least one armor layer on the outside of the pressure vault,
at least one additional passage for gas circulation through the pressure vault from an inside of the pressure vault to an outside of the pressure vault being defined in the at least one stud and/or in the bottom of the groove, the additional passage allowing the flow of gas between the inside of the pressure vault and the outside of the pressure vault in addition to at least one clearance between the at least one stud of a turn and the bottom of the adjacent groove of the adjacent turn, or in the absence of clearance between the at least one stud of a turn and the bottom of the adjacent groove of the adjacent turn.

14. The method according to claim 13, wherein the at least one additional flow passage is formed by making a notch in the at least one stud and/or by making a through hole through the bottom of the groove.

15. A method for transporting fluid comprising using a flexible pipe according to claim 1 to transport fluid through the fluid flow passage, the method comprising diffusing a gas contained in the fluid through the tubular sheath, and then through the pressure vault, via the additional passage, from inside the pressure vault to the outside of the pressure vault.

16. A flexible fluid transport pipe comprising:
a tubular sheath made of polymer, the tubular sheath defining a fluid circulation passage with a central axis;
a pressure vault, arranged around and outside the tubular sheath, the pressure vault comprising a short-pitch winding of at least one interlocked shaped wire, the shaped wire comprising a plurality of interlocked turns, each turn having a profile, in section in a median axial plane, defining at least one stud and, for the at least one stud, a groove adjacent to the at least one stud, the at least one stud being capable of being interlocked in an adjacent groove of an adjacent turn of a shaped wire of the pressure vault;
at least one armor layer arranged outside the pressure vault; and
at least one additional passage for gas circulation through the pressure vault from the inside of the pressure vault to the outside of the pressure vault, defined in the at least one stud and/or in the bottom of the groove, the additional passage allowing the flow of gas between an inside of the pressure vault and an outside of the pressure vault in addition to at least one clearance between the at least one stud of a turn and the bottom of the adjacent groove of the adjacent turn, or in the absence of clearance between the at least one stud of a turn and the bottom of the adjacent groove of the adjacent turn, wherein the at least one additional passage is formed by a notch provided in the at least one stud and/or at the least one additional passage is formed by a through hole provided in the bottom of the groove.

* * * * *